United States Patent
Graffy et al.

(10) Patent No.: US 10,474,619 B2
(45) Date of Patent: Nov. 12, 2019

(54) METHODS FOR MANAGING COMMUNICATIONS INVOLVING A LOCKSTEP PROCESSING SYSTEM

(71) Applicant: GE Aviation Systems LLC, Grand Rapids, MI (US)

(72) Inventors: Melanie Sue-Hanson Graffy, Byron Center, MI (US); Jon Marc Diekema, Jenison, MI (US)

(73) Assignee: General Electric Company, Schenectady, NY (US)

( * ) Notice: Subject to any disclaimer, the term of this patent is extended or adjusted under 35 U.S.C. 154(b) by 57 days.

(21) Appl. No.: 15/599,546

(22) Filed: May 19, 2017

(65) Prior Publication Data

US 2018/0336157 A1  Nov. 22, 2018

(51) Int. Cl.
*G06F 13/42* (2006.01)
*G06F 11/16* (2006.01)

(52) U.S. Cl.
CPC ........ *G06F 13/423* (2013.01); *G06F 11/1645* (2013.01); *G06F 11/1675* (2013.01); *G06F 11/1616* (2013.01); *G06F 13/4217* (2013.01)

(58) Field of Classification Search
CPC ............................ G06F 13/423; G06F 13/4217
See application file for complete search history.

(56) References Cited

U.S. PATENT DOCUMENTS

| | | | |
|---|---|---|---|
| 5,226,152 A | 7/1993 | Klug et al. | |
| 7,178,058 B2 * | 2/2007 | Tsukahara | ........... G06F 11/1645 714/11 |
| 7,194,663 B2 | 3/2007 | Fletcher et al. | |
| 7,290,169 B2 | 10/2007 | Safford et al. | |
| 7,366,948 B2 | 4/2008 | Michaelis et al. | |
| 7,412,353 B2 | 8/2008 | Borkar et al. | |
| 7,987,385 B2 | 7/2011 | Pruiett et al. | |
| 8,105,885 B1 * | 1/2012 | Lee | ..................... H01L 27/0207 257/E21.67 |
| 8,489,792 B2 | 7/2013 | Byrne et al. | |

(Continued)

FOREIGN PATENT DOCUMENTS

DE    19543817 A1    5/1997

OTHER PUBLICATIONS

European Search Report Corresponding to EP Application 18171910.5 dated Apr. 3, 2019.

(Continued)

*Primary Examiner* — Phil K Nguyen
(74) *Attorney, Agent, or Firm* — Dority & Manning, P.A.

(57) ABSTRACT

A method for managing communications involving a lockstep processing comprising at least a first processor and a second processor can include receiving, at a data synchronizer, a first signal from a first device. The method can also include receiving, at the data synchronizer, a second signal from a second device. In addition, the method can include determining, by the data synchronizer, whether the first signal is equal to the second signal. When the first signal is equal to the second signal, the method can include transmitting, by the data synchronizer, the first signal to the first processor and the second signal to the second processor. Specifically, in example embodiments, transmitting the first signal to the first processor can occur synchronously with transmitting the second signal to the second processor.

10 Claims, 9 Drawing Sheets

(56) References Cited

U.S. PATENT DOCUMENTS

| | | |
|---|---|---|
| 8,499,193 B2 | 7/2013 | Wilt et al. |
| 8,589,737 B2 | 11/2013 | Rohleder et al. |
| 8,959,392 B2 | 2/2015 | Traskov et al. |
| 9,152,511 B2 | 10/2015 | Rohleder et al. |
| 9,170,907 B2 | 10/2015 | Van Stensel |
| 10,089,194 B2* | 10/2018 | Jain .................... G06F 11/1604 |
| 2001/0027542 A1* | 10/2001 | Sugeno .................. H04L 12/46 |
| | | 714/43 |
| 2001/0034824 A1* | 10/2001 | Mukherjee ............. G06F 9/383 |
| | | 712/215 |
| 2004/0267994 A1* | 12/2004 | Mathewson ........ G06F 15/7867 |
| | | 710/110 |
| 2005/0240810 A1* | 10/2005 | Safford ............... G06F 11/1625 |
| | | 714/10 |
| 2005/0240811 A1 | 10/2005 | Safford et al. |
| 2006/0107116 A1 | 5/2006 | Michaelis et al. |
| 2006/0195751 A1 | 8/2006 | Hess et al. |
| 2007/0168712 A1* | 7/2007 | Racunas ............. G06F 11/1637 |
| | | 714/12 |
| 2010/0287443 A1* | 11/2010 | Rohleder ................ G06F 11/10 |
| | | 714/758 |
| 2011/0301720 A1* | 12/2011 | Ehrhart .............. G05B 19/0425 |
| | | 700/12 |
| 2012/0030519 A1* | 2/2012 | Wilt .................... G06F 11/1637 |
| | | 714/43 |
| 2013/0124922 A1* | 5/2013 | Van Stensel ........ G06F 11/1633 |
| | | 714/37 |

OTHER PUBLICATIONS

Cuyvers et al., Fault—Tolerance in Process Control: Possibilities, Limitations and Trends, XP000178688, Journal A, vol. 31, No. 4, Dec. 1, 1990, pp. 33-40.

Gronemeyer, SIMIS 3116—Sicheres Microcomputersystem Fuer Den Fahrzeugeinsatz, XP000297208, Signal + Draht, vol. 84, No. ½, Jan./Feb. 1992, pp. 10-14.

* cited by examiner

METHODS FOR MANAGING COMMUNICATIONS INVOLVING A LOCKSTEP PROCESSING SYSTEM

FIELD

The present subject matter relates generally to lockstep processing systems.

BACKGROUND

Processor systems used for critical real-time processing applications have inherent problems in determining when a hardware failure has occurred and taking subsequent corrective action. One method of detecting such failures and maintaining consistent operation is to use a lockstep processing system having redundant processors. In such situations, the processors each perform the same exact instruction at the same time. This is called lockstep processing. If a mismatch between the inputs or the outputs of the processors exists, the processors are no longer operating in lockstep with one another.

However, the lockstep processing system has its drawbacks. In particular, asynchronous inputs to the lockstep processing system will generally fail. Whenever asynchronous signals are sampled, there are times when the input signal will change during the sampling time. When this occurs, there is a probability that the input signals change may not be seen by one of the processors. As an example, when the input signal causes a processor interrupt to occur, one processor may respond to the interrupt and start execution of an interrupt service routine before the other processor. Hence, the two processors will not remain in lockstep even though a hardware fault has not occurred.

BRIEF DESCRIPTION

Aspects and advantages of the present disclosure will be set forth in part in the following description, or may be obvious from the description, or may be learned through practice of the present disclosure.

In one example embodiment, a method for managing communications involving a lockstep processing comprising at least a first processor and a second processor can include receiving, at a data synchronizer, a first signal from a first device. The method can also include receiving, at the data synchronizer, a second signal from a second device. In addition, the method can include determining, by the data synchronizer, whether the first signal is equal to the second signal. When the first signal is equal to the second signal, the method can include transmitting, by the data synchronizer, the first signal to the first processor and the second signal to the second processor. Specifically, in example embodiments, transmitting the first signal to the first processor can occur synchronously with transmitting the second signal to the second processor.

In another example embodiment, communications involving a lockstep processing system comprising at least a first processor and a second processor can be managed by a data synchronizer having a first processing lane and a second processing lane. The data synchronizer can be configured to receive a first signal at the first processing lane. The data synchronizer can also be configured to transmit the first data signal to the second processing lane. In addition, the data synchronizer can be configured to transmit the first signal from the first processing lane to the lockstep processing system. The data synchronizer can also be configured to transmit the second signal from the second processing lane to the lockstep processing system. Specifically, in example embodiments, transmitting the first signal from the first processing lane to the lockstep processing system occurs synchronously with transmitting the second signal from the second processing lane to the lockstep processing system.

In yet another example embodiment, a method for managing communications involving a lockstep processing system comprising at least a first processor and a second processor can include receiving, at a first processing lane of a data synchronizer, a first signal from a first device. The method can also include transmitting, by the data synchronizer, the first signal from the first processing lane to a second processing lane of the data synchronizer. In addition, the method can include transmitting, by the data synchronizer, the first signal from the first processing lane to the lockstep processing system. The method can also include transmitting, by the data synchronizer, the first signal from the second processing lane to the lockstep processing system. Specifically, in example embodiments, transmission of the first signal from the first processing lane to the lockstep processing system occurs synchronously with transmission of the first signal from the second processing lane to the lockstep processing system.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended Figs., in which.

DETAILED DESCRIPTION

Figure 1:
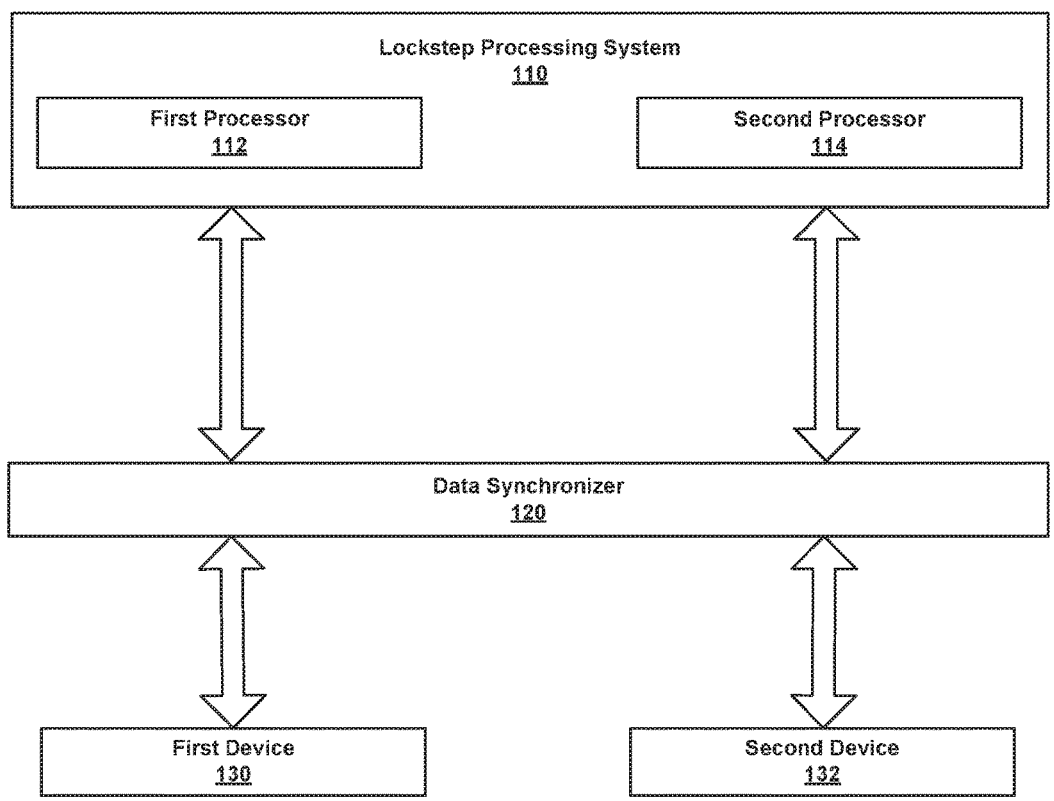
FIG. 1 illustrates an example system for managing communications involving a lockstep processing system according to example embodiments of the present disclosure.

Reference will now be made in detail to present embodiments of the present disclosure, one or more examples of which are illustrated in the accompanying drawings. The detailed description uses numerical and letter designations to refer to features in the drawings.

As used herein, the terms "first" and "second" can be used interchangeably to distinguish one component from another and are not intended to signify location or importance of the individual components. The singular forms "a", "an", and "the" include plural references unless the context clearly dictates otherwise.

Example aspects of the present disclosure are directed to systems and methods for managing communications involving a lockstep processing system. Specifically, in example embodiments, the lockstep processing system can include at least a first processor and a second processor. The first and second processors can both operate in a lockstep mode in which the first processor and the second processor both execute the same set of instructions.

In example embodiments, a data synchronizer can be communicatively coupled to the lockstep processing system. In this way, the data synchronizer can manage communications between the lockstep processing system and one or more devices, such as memory controllers. In particular, the data synchronizer can include a first processing lane and a second processing lane communicatively coupled to one another via a cross-channel interface. As such, one or more signals entering the data synchronizer at the first processing lane can be transmitted to the second processing lane via the cross-channel interface. Likewise, one or more signals entering the data synchronizer at the second processing lane can be transmitted to the first processing lane via the cross-channel interface. In this way, the data synchronizer can compare signals between the two processing lanes.

When a signal entering the data synchronizer at the first processing lane is equal to a signal entering the data synchronizer at the second processing lane, the data synchronizer can be configured to synchronously transmit the signals to the lockstep processing system. In this way, the data synchronizer can ensure the first and second processors of the lockstep processing system both operate in a lockstep mode in which the first and second processors execute the same set of instructions.

The data synchronizer and methods of using the data synchronizer according to example aspects of the present disclosure can have a number of technical effects and benefits. For instance, example aspects of the present disclosure have a technical effect of improving integrity of data transferred to and from the lockstep processing system. As follows, the reliability of lockstep processing systems used in avionics systems for aerial vehicles and other applications can be improved.

With reference now to the FIGS., example embodiments of the present disclosure will be discussed in further detail. FIG. 1 depicts an example embodiment of a system 100 for managing communications involving a lockstep processing system 110. In one example embodiment, the lockstep processing system 110 can include a first processor 112 and a second processor 114. However, in alternative embodiments, the lockstep processing system 110 can include three or more processors. It should be appreciated, however, that both the first processor 112 and the second processor 114 each operate in a lockstep mode in which the first and second processors 112, 114 each synchronously execute the same set of instructions.

As shown, the system 100 can include a data synchronizer 120 comprising a first processing lane 122 and a second processing lane 124. In example embodiments, the data synchronizer 120 can be communicatively coupled to a first device 130 and a second device 132. In particular, the first device 130 can be in communication with the first processing lane 122, and the second device 132 can be in communication with the second processing lane 124. In this way, the first processing lane 122 can receive one or more signals originating from the first device 130, and the second processing lane 124 can receive one or more signals originating from the second device 132.

As shown, the data synchronizer 120 can be communicatively coupled to the lockstep processing system 110. More specifically, the first processor 112 can be communicatively coupled to the first processing lane 122, and the second processor 114 can be communicatively coupled to the second processing lane 124. In this way, the first processing lane 122 can receive one or more signals originating from the first processor 112, and the second processing lane 124 can receive one or more signals originating from the second processor 114. Likewise, the first processor 112 can receive one or more signals from the first processing lane 122, and the second processor 114 can receive one or more signals from the second processing lane 124. As will be discussed below in more detail, the data synchronizer 120 can manage communications between the lockstep processing system 110 and at least one of the first and second devices 130, 132.

Figure 2:
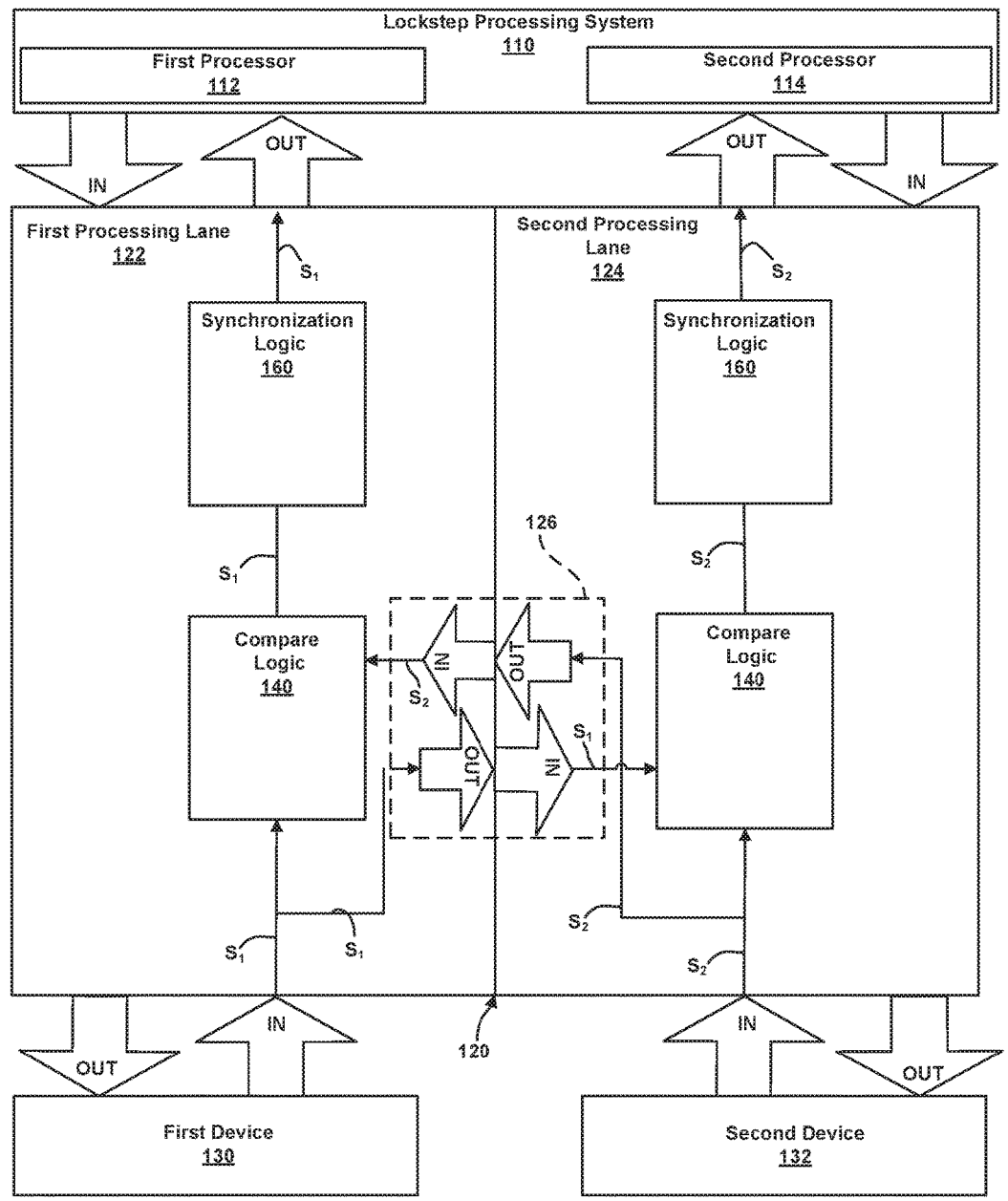
FIG. 2 illustrates a data synchronizer of the system depicted in FIG. 1 receiving a first signal and a second signal according to example embodiments of the present disclosure.

Referring now to FIG. 2, example embodiments of the data synchronizer 120 can include a cross-channel interface 126 to provide communications between the first processing lane 122 and the second processing lane 124. In this way, one or more signals entering the data synchronizer 120 at the first processing lane 122 can be communicated to the second processing lane 124. Likewise, one or more signals entering the data synchronizer 120 at the second processing lane 124 can be communicated to the first processing lane 122.

As shown, the data synchronizer 120 can receive a first signal $S_1$ and a second signal $S_2$. In particular, the first signal $S_1$ can originate from the first device 130, and the second signal $S_2$ can originate from the second device 132. As shown, the first signal $S_1$ can enter the data synchronizer 120 at the first processing lane 122, and the second signal $S_2$ can enter the data synchronizer 120 at the second processing lane 124.

It should be appreciated that the first and second signals $S_1$ and $S_2$ can be any suitable signal. In one example embodiment, the first signal $S_1$ can be an address read (AR) signal originating from the first device 130. In another example embodiment, the second signal $S_2$ can be an address write (AW) signal originating from the second device 132. In yet another example embodiment, the first signal $S_1$, the second signal $S_2$, or both can be a write (W) signal.

As shown, the first signal $S_1$ can be transmitted from the first processing lane 122 to the second processing lane 124 via the cross-channel interface 126. Likewise, the second signal $S_2$ can be transmitted from the second processing lane 124 to the first processing lane 122 via the cross-channel interface 126. As will be discussed below in more detail, the data synchronizer 120 can be configured to determine whether the first signal $S_1$ and second signal $S_2$ are equal to one another.

In example embodiments, both the first processing lane 122 and the second processing lane 124 can include compare logic 140 that, when executed, configures the data synchronizer 120 to compare the first and second signals $S_1$ and $S_2$ to one another. It should be appreciated that the compare logic 140 can implement any suitable method for determine whether the first signal $S_1$ and the second signal $S_2$ are equal to one another. For example, the compare logic 140, when executed, can configure the data synchronizer 120 to correlate the first signal $S_1$ with the second signal $S_2$ to determine a correlation factor value that is indicative of a similarity between the first signal $S_1$ and the second signal $S_1$. In one example embodiment, a correlation factor value of one (1) can indicate the first signal $S_1$ and the second signal $S_2$ are equal to one another. Further, a correlation factor value of zero (0) can indicate the first signal $S_1$ and the second signal $S_2$ are not equal to one another.

If the data synchronizer 120 determines the first signal $S_1$ and the second signal $S_2$ are not equal to one another, then neither the first signal $S_1$ nor the second signal $S_2$ are transmitted to the lockstep processing system 110. Instead, the data synchronizer 120 can generate a first response signal (not shown) that is unique to the first signal $S_1$. In addition, the data synchronizer 120 can generate a second response signal (also not shown) that is unique to the second signal $S_2$. In one example embodiment, the first response signal can be generated for the first device 130, and the second response signal can be generated for the second device 132. In addition, the data synchronizer 120 can transmit the first response signal to the first device 130, and the second response signal to the second device 132.

If the data synchronizer 120 determines the first signal $S_1$ and the second signal $S_2$ are equal to one another, then the data synchronizer 120 can synchronously transmit the first signal $S_1$ and the second signal $S_2$ to the lockstep processing system 110. In one example embodiment, both the first processing lane 122 and the second processing lane 124 can include synchronization logic 160 that, when executed, configures the data synchronizer 120 to synchronously transmit the first signal $S_1$ to the first processor 112, and the second signal $S_2$ to the second processor 114. In alternative embodiments, the first signal $S_1$ can be transmitted to the second processor 114, and the second signal $S_2$ can be transmitted to the first processor 112.

Figure 3:
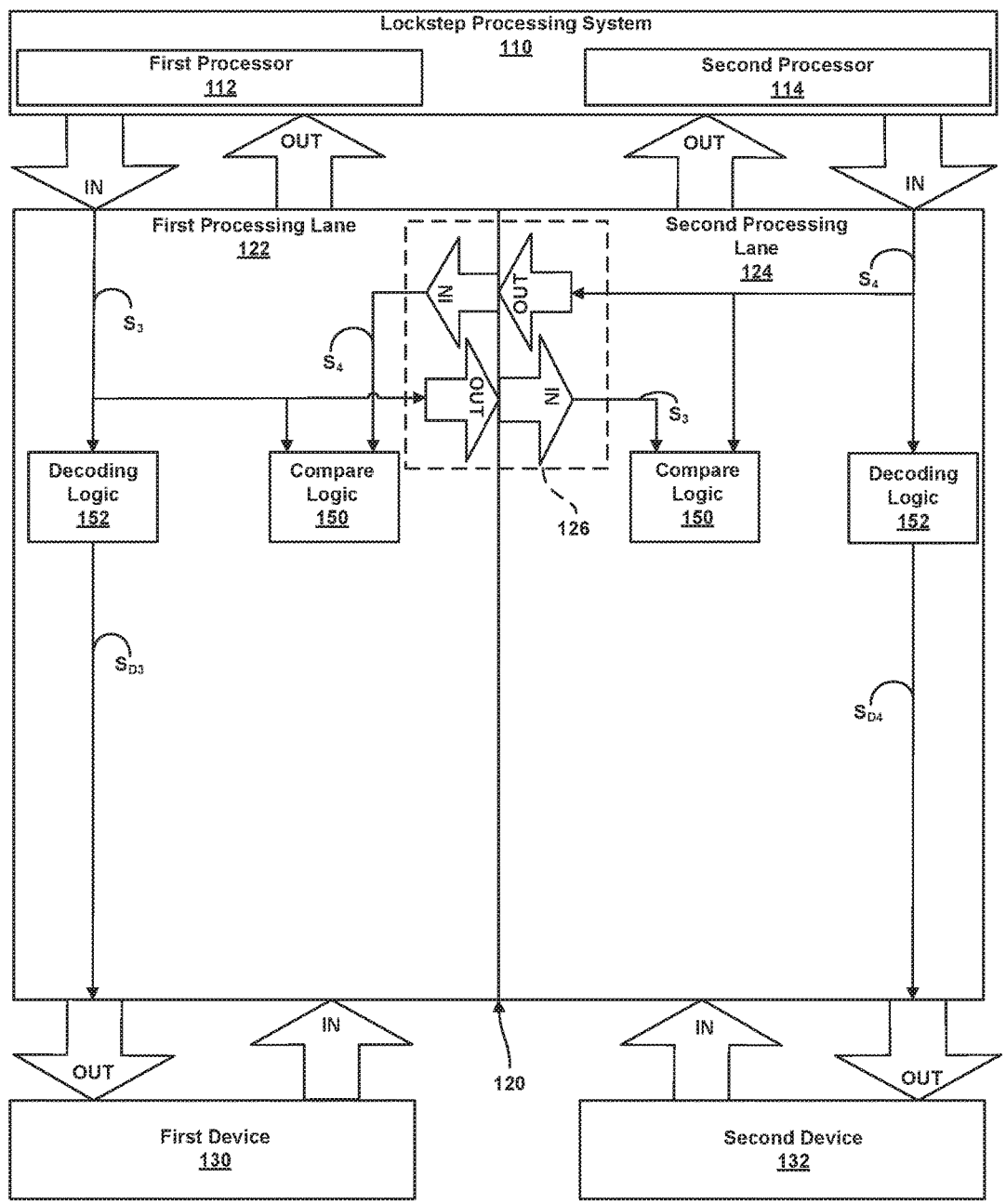
FIG. 3 illustrates the example data synchronizer of FIG. 1 receiving a third signal and a fourth signal according to example embodiments of the present disclosure.

Referring now to FIG. 3, the data synchronizer 120 can simultaneously receive a third signal $S_3$ and a fourth signal $S_4$ from the lockstep processing system 110. In example embodiments, the first processor 112 can generate the third signal $S_3$ in response to receiving the first signal $S_1$. In addition, the second processor 114 can generate the fourth signal $S_4$ in response to receiving the second signal $S_2$. As shown, the third signal $S_3$ can enter the data synchronizer 120 at the first processing lane 122. Additionally, the fourth signal $S_4$ can enter the data synchronizer 120 at the second processing lane 124.

It should be appreciated that the third and fourth signals $S_3$ and $S_4$ can be any suitable signal. In one example embodiment, both the third signal $S_3$ and the fourth signal $S_4$ can be a read data (R) signal. In another example embodiment, both the third and fourth signal $S_3$ and $S_4$ can be a write response (B) signal.

As shown, the third signal $S_3$ can be transmitted from the first processing lane 122 to the second processing lane 124 via the cross-channel interface 126. Likewise, the fourth signal $S_4$ can be transmitted from the second processing lane 124 to the first processing lane 122 via the cross-channel interface 126. As will be discussed below in more detail, the data synchronizer 120 can be configured to determine whether the third signal $S_3$ and the fourth signal $S_4$ are cycle accurate.

In example embodiments, the first processing lane 122 and the second processing lane 124 can each include compare logic 150. As shown, the third signal $S_3$ and the fourth signal $S_4$ can be inputs to the compare logic 150. In this respect, the compare logic 150, when executed, can configure the data synchronizer 120 to compare the third and fourth signals $S_3$ and $S_4$ to one another.

It should be appreciated that the compare logic 150 can include any suitable application specific integrated circuit (ASIC) configured for determining whether the third signal $S_3$ and the fourth signal $S_4$ are equal to one another. In one example embodiment, the compare logic 150 can include an exclusive OR gate. More specifically, the exclusive OR gate can generate a first value (e.g., 0) when the third signal $S_3$ and the fourth signal $S_4$ are equal to one another. In contrast, the exclusive OR gate can generate a second value (e.g., 1) when the third signal $S_3$ and the fourth signal $S_4$ are not equal to one another.

If the exclusive OR gate generates the first value, then the outputs (e.g., third signal $S_3$ and fourth signal $S_4$) of the first and second processor 112, 114 are cycle accurate (that is, $S_3$ matches $S_4$). In contrast, if the exclusive OR gate generates the second value, then the outputs of the first and second processors 112, 114 are not cycle accurate (that is, $S_3$ does not match $S_4$). In this way, the compare logic 150, when executed, can configure the data synchronizer 120 to determine whether the first processor 112 and second processor 114 are operating in the lockstep mode.

Still referring to FIG. 3, the first processing lane 122 and the second processing lane 124 can each include decoding logic 152. As shown, the decoding logic 152 of the first processing lane 122 can receive the third signal $S_3$ as an input. In this way, the decoding logic 152 of the first processing lane 122 can decode the third signal $S_3$ to generate a decoded third signal $S_{D3}$. As shown, the decoding logic 152 of the second processing lane 124 can receive the fourth signal $S_4$ as an input. In this way, the decoding logic 152 of the second processing lane 124 can decode the fourth signal $S_4$ to generate a decoded fourth signal $S_{D4}$.

As shown, the decoded third signal $S_{D3}$ can be transmitted to the first device 130. In addition, the decoded fourth signal $S_{D4}$ can be transmitted to the second device 132. However, in alternative embodiments, the decoded third signal $S_{D3}$ can be transmitted to the second device 132, and the decoded fourth signal $S_{D4}$ can be transmitted to the first device 130.

It should be appreciated that the compare logic 150 and the decoding logic 152 can be executed in parallel. As such, the third and fourth signal $S_3$ and $S_4$ can be decoded and simultaneously compared with one another. However, it should be appreciated that the compare logic 150 can be executed within a fewer number of clock cycles than the decoding logic 152. As such, if the data synchronizer 120 determines the third signal $S_3$ and the fourth signal $S_4$ are not equal to one another, the data synchronizer 120 can be configured to stop transmission of the decoded third and fourth signal $S_{D3}$ and $S_{D4}$ to the first device 130 and the second device 132, respectively.

The system 100 of FIGS. 2 and 3 provides numerous technical advantages. For example, since the first processing lane 122 and the second processing lanes 124 are communicatively coupled to one another via the cross-channel interface 126, the data synchronizer 120 provides error checking across both the first and second processing lanes

122 and 124. In this way, the integrity of data transferred to and from the lockstep processing system 100 can be improved.

Figure 4:
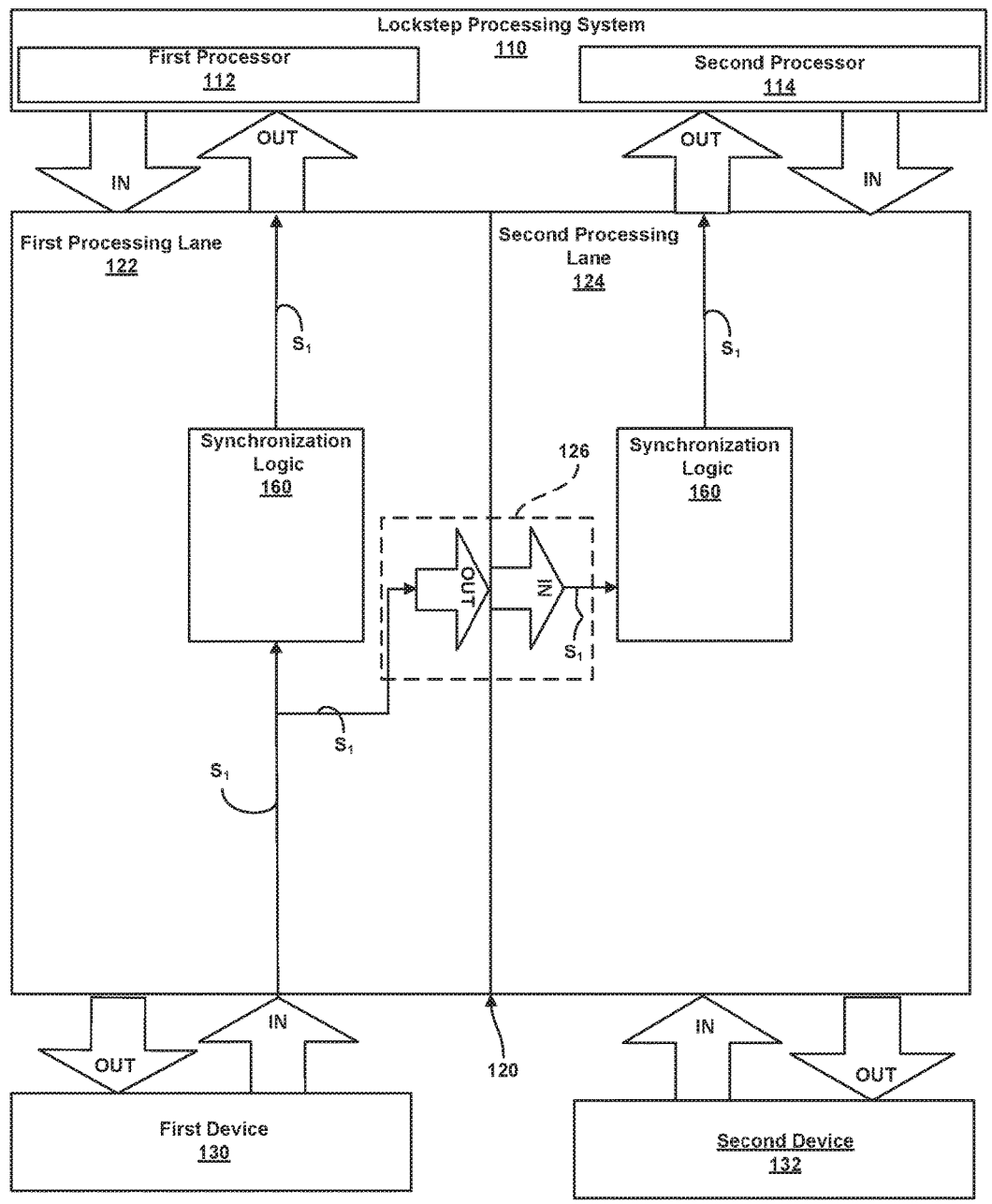
FIG. 4 illustrates another example data synchronizer receiving a first signal according to example embodiments of the present disclosure.

FIG. 4 illustrates another example embodiment of a system 100 for managing communications involving the lockstep processing system 110. As shown, a first signal $S_1$ originating from the first device 130 can be received at the first processing lane 122 of the data synchronizer 120. In particular, the first signal $S_1$ can be an input to synchronization logic 160 of the first processing lane 122. In addition, the first signal $S_1$ can be transmitted to the second processing lane 124 via the cross-channel interface 126. In particular, the first signal $S_1$ can be transmitted to synchronization logic 160 of the second processing lane 124. In this way, the first signal $S_1$ can be synchronously transmitted to the lockstep processing system 110 in both the first processing lane 122 and the second processing lane 124.

Figure 5:
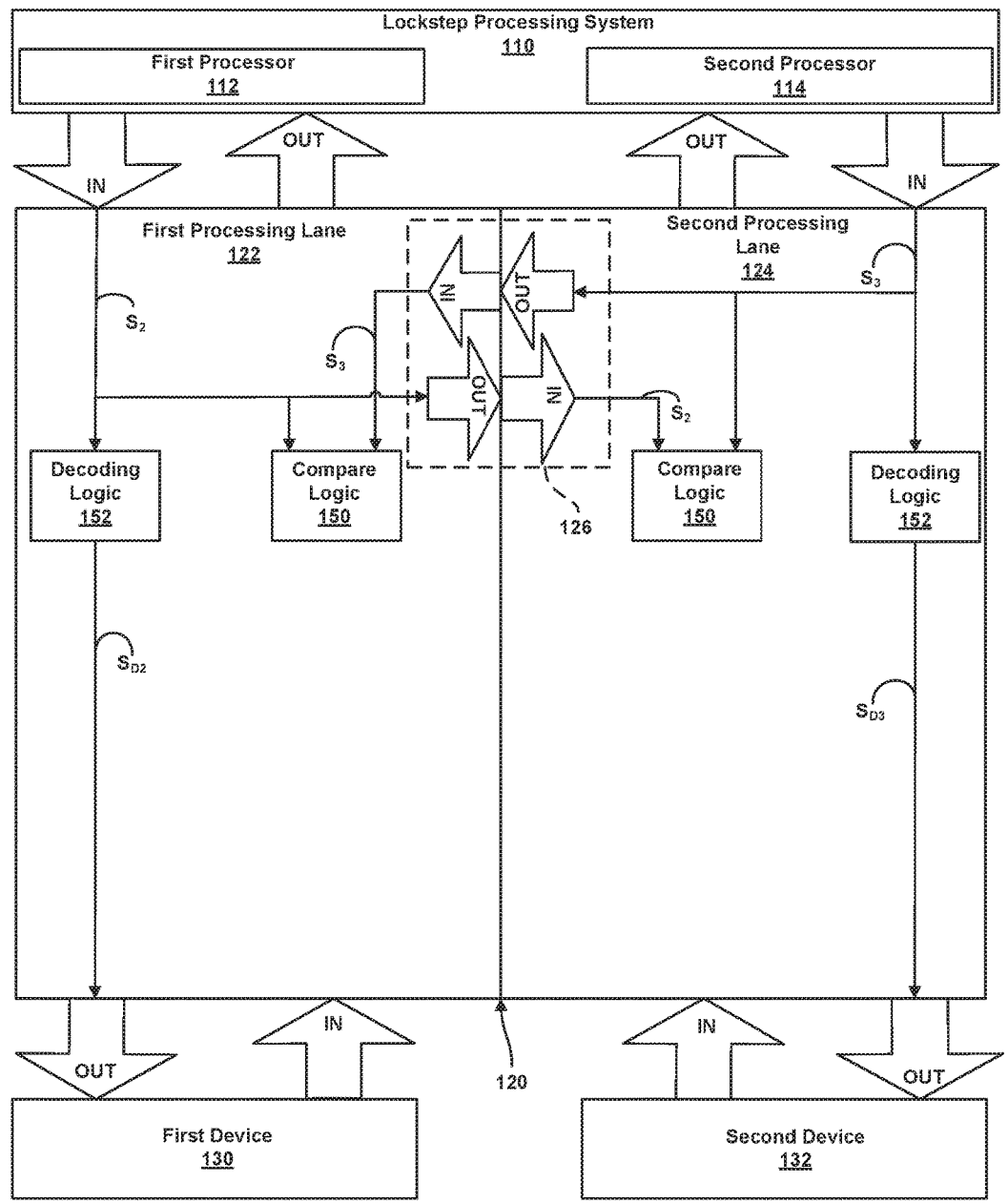
FIG. 5 illustrates the example data synchronizer of FIG. 4 receiving a second signal and a third signal according to example embodiments of the present disclosure.

Referring now to FIG. 5, the lockstep processing system 110 can generate a second signal $S_2$ and a third signal $S_3$ in response to the first signal $S_1$ (FIG. 4) received from the data synchronizer 120. In one example embodiment, the first processor 112 can generate the second signal $S_2$ in response to receiving the first signal $S_1$. In addition, the second processor 114 can generate the third signal $S_3$ in response to receiving the first signal $S_1$. In example embodiments, the first processing lane 122 and the second processing lane 124 can simultaneously receive the second signal $S_2$ and a third signal $S_3$, respectively. In particular, the second signal $S_2$ can enter the data synchronizer 120 at the first processing lane 122, and the third signal $S_3$ can enter the data synchronizer 120 at the second processing lane 124.

It should be appreciated that the second and third signals $S_2$ and $S_3$ can be any suitable signal. In one example embodiment, both the second signal $S_2$ and the third signal $S_3$ can be a read data (R) signal. In another example embodiment, both the second signal $S_2$ and the third signal $S_3$ can be a write response (B) signal.

As shown, the second signal $S_2$ can be transmitted from the first processing lane 122 to the second processing lane 124 via the cross-channel interface 126. Likewise, the third signal $S_3$ can be transmitted from the second processing lane 124 to the first processing lane 122 via the cross-channel interface 126. As will be discussed below in more detail, the data synchronizer 120 can be configured to determine whether the second signal $S_2$ and the third signal $S_3$ are cycle accurate.

In example embodiments, the first processing lane 122 and the second processing lane 124 can each include compare logic 150. As shown, the second signal $S_2$ and the third signal $S_3$ can be inputs to the compare logic 150. In this respect, the compare logic 150, when executed, can configure the data synchronizer 120 to compare the second and third signals $S_2$ and $S_3$ to one another.

It should be appreciated that the compare logic 150 can include any suitable application specific integrated circuit (ASIC) configured for determining whether the second signal $S_2$ and the third signal $S_3$ are equal to one another. In one example embodiment, the compare logic 150 can include an exclusive OR gate. More specifically, the exclusive OR gate can generate a first value (e.g., 0) when the second signal $S_2$ and the third signal $S_3$ are equal to one another. In contrast, the exclusive OR gate can generate a second value (e.g., 1) when the second signal $S_2$ and the third signal $S_3$ are not equal to one another.

If the exclusive OR gate generates the first value, then the outputs (e.g., second signal $S_2$ and third signal $S_3$) of the first and second processor 112, 114 are cycle accurate. In contrast, if the exclusive OR gate generates the second value, then the outputs of the first and second processors 112, 114 are cycle accurate. In this way, the compare logic 150, when executed, can configure the data synchronizer 120 to determine whether the first processor 112 and second processor 114 are operating in the lockstep mode.

Still referring to FIG. 5, the first processing lane 122 and the second processing lane 124 can each include decoding logic 152. As shown, the decoding logic 152 of the first processing lane 122 can receive the second signal $S_2$ as an input. In this way, the decoding logic 152 of the first processing lane 122 can decode the second signal $S_2$ to generate a decoded second signal $S_{D2}$. As shown, the decoding logic 152 of the second processing lane 124 can receive the third signal $S_3$ as an input. In this way, the decoding logic 152 of the second processing lane 124 can decode the third signal $S_3$ to generate a decoded third signal $S_{D3}$.

As shown, the decoded second signal $S_{D2}$ can be transmitted to the first device 130. In addition, the decoded third signal $S_{D3}$ can be transmitted to the second device 132. However, in alternative embodiments, the decoded second signal $S_{D2}$ can be transmitted to the second device 132, and the decoded third signal $S_{D3}$ can be transmitted to the first device 130.

It should be appreciated that the compare logic 150 and the decoding logic 152 can be executed in parallel. As such, the second and third signal $S_2$ and $S_3$ can be decoded and simultaneously compared with one another. However, it should be appreciated that the compare logic 150 can be executed within a fewer number of clock cycles than the decoding logic 152. As such, if the data synchronizer 120 determines the second signal $S_2$ and the third signal $S_3$ are not equal to one another, the data synchronizer 120 can be configured to stop transmission of the decoded second and third signal $S_{D2}$ and $S_{D3}$ to the first device 130 and the second device 132, respectively.

Figure 6:
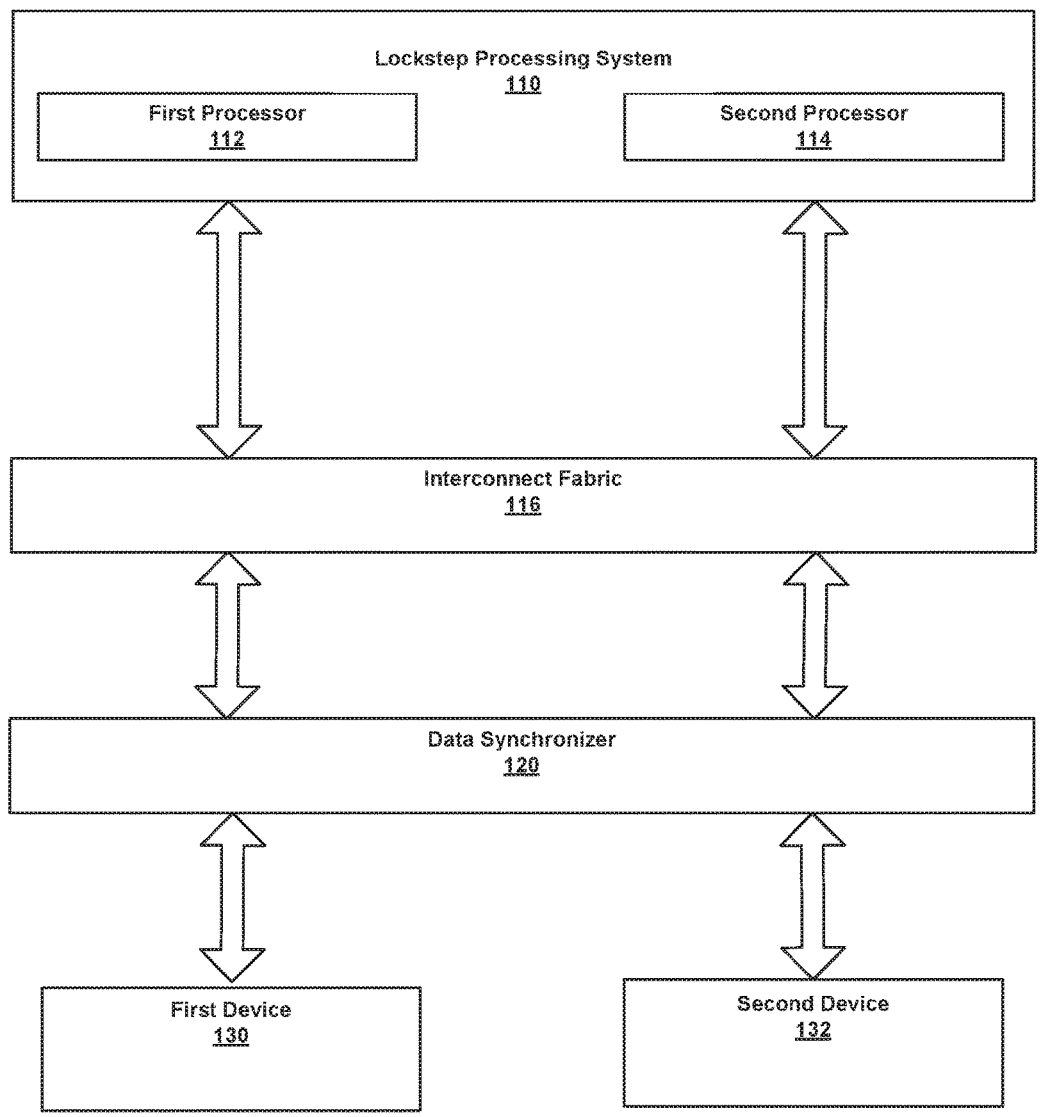
FIG. 6 illustrates another example system for managing communications involving a lockstep processing system according to example embodiments of the present disclosure.

FIG. 6 depicts another example embodiment of a system 100 for managing communications involving the lockstep processing system 110. As shown, the system 100 can include an interconnect fabric 116 to provide communications between the lockstep processing system 110 and the data synchronizer 120. As such, the data synchronizer 120 can communicate with the lockstep processing system 110 through the interconnect fabric 116. In one example embodiment, the interconnect fabric 116 can receive one or more signals exiting the data synchronizer 120. In addition, the interconnect fabric 116 can communicate the one or more signals to the first processor 112, the second processor 114, or both.

It should be appreciated that the system 100 of FIG. 6 has numerous advantages. As an example, the first processor 112 and the second processor 114 can each be replaced with processors designed for non-lockstep applications without sacrificing the performance and tight coupling between the processors and the interconnect fabric. Inn this way, software written for the processors can be executed unchanged in lockstep applications.

Figure 7:
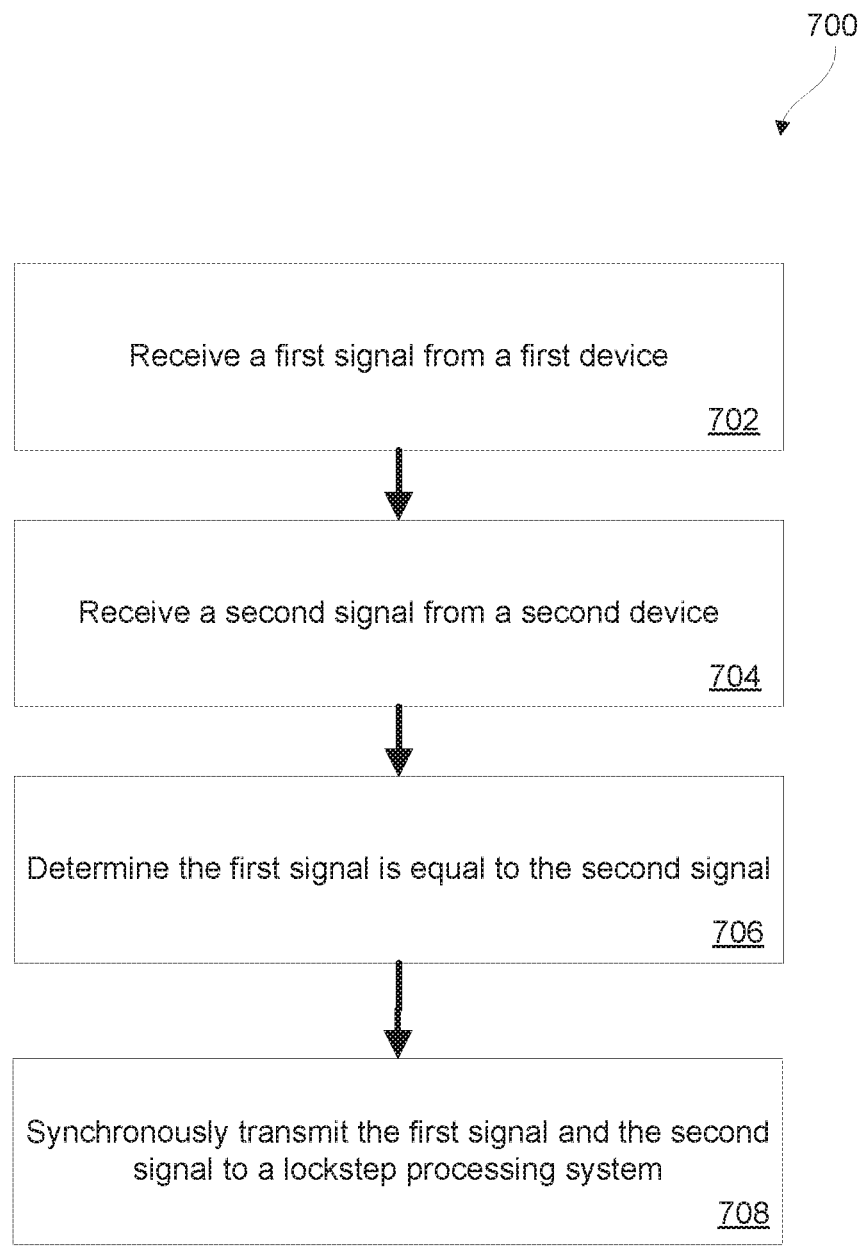
FIG. 7 illustrates a flow diagram of an example method for managing communications involving a lockstep processing system according to example embodiments of the present disclosure.

Referring now to FIG. 7, a flow diagram of one embodiment of a method 700 for managing communications involving a lockstep processing system in accordance with aspects of the present subject matter. In general, the method 700 will be discussed herein with reference to the system(s) described above with reference to FIGS. 1-3. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (702), the method 700 can include receiving, at a data synchronizer, a first signal from a first device. At (704), the method 700 can include receiving, at the data synchronizer, a second signal from a second device. Specifically, in exemplary embodiments, the data synchronizer can simultaneously receive the first and second signals from the first and second devices, respectively.

At (706), the method 700 can include determining, by the data synchronizer, whether the first signal is equal to the second signal. Specifically, in example embodiments, the data synchronizer can compare the first signal with the second signal. In particular, the data synchronizer can calculate a correlation factor value that is indicative of a similarity between the first signal and the second signal. In one example embodiment, a correlation factor value of 1 can indicate the first and second signals are equal to one another. In contrast, a correlation factor value of 0 can indicate the first and second signals are not equal to one another.

When the data synchronizer determines the first signal and the second signal are equal to one another, the method 700 can include, at (708), transmitting, by the data synchronizer, the first signal to the first processor and the second signal to the second processor. Specifically, in exemplary embodiments, transmission of the first signal can occur synchronously with the second signal.

Figure 8:
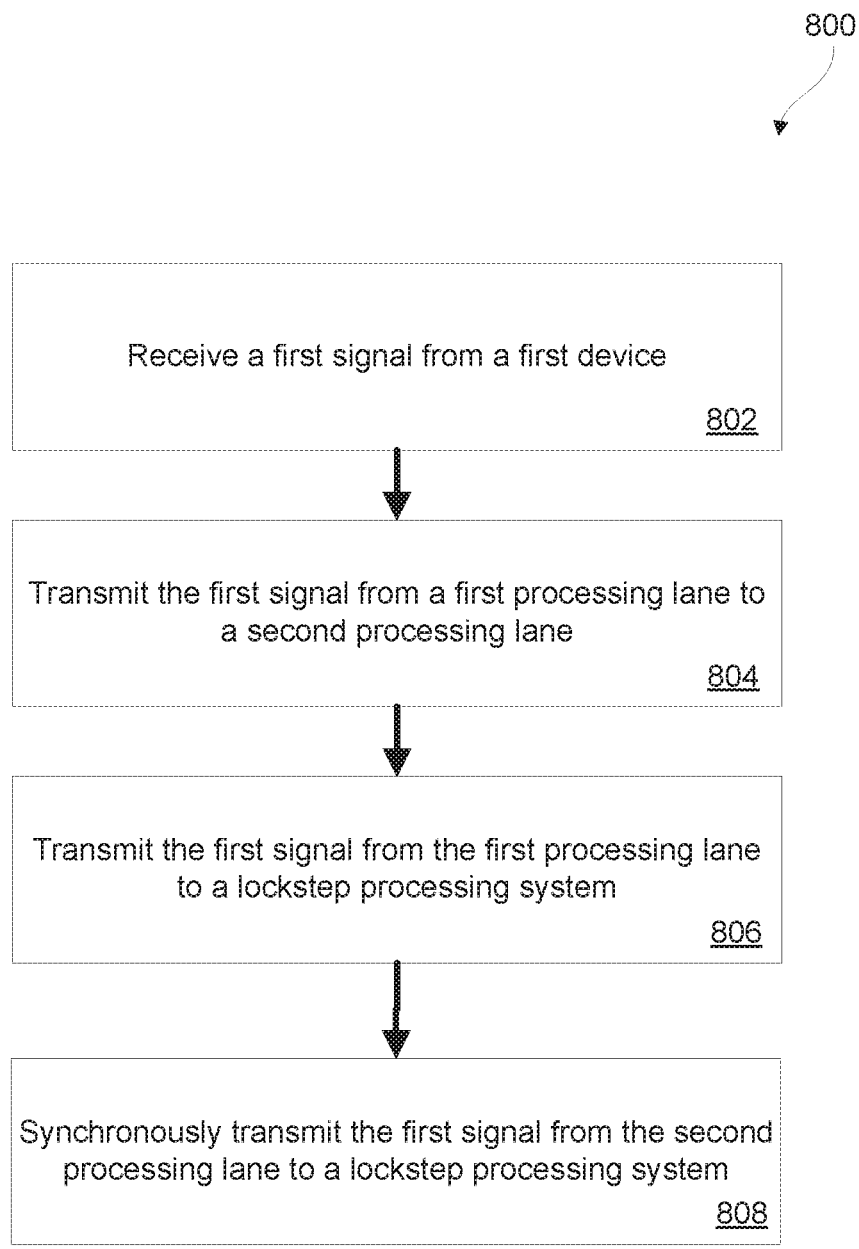
FIG. 8 illustrates a flow diagram of another example method for managing communications involving a lockstep processing system according to example embodiments of the present disclosure.

Referring now to FIG. 8, a flow diagram of one embodiment of a method 800 for managing communications involving a lockstep processing system in accordance with aspects of the present subject matter. In general, the method 800 will be discussed herein with reference to the system(s) described above with reference to FIGS. 4 and 5. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (802), the method 800 can include receiving, at a data synchronizer, a first signal from a first device. At (804), the method 800 can include transmitting, by a cross-channel interface of the data synchronizer, the first signal to a second processing lane of the data synchronizer.

At (806), the method 800 can include transmitting, by the data synchronizer, the first signal from the first processing lane to the lockstep processing system. At (808), the method 800 can include transmitting, by the data synchronizer, the first signal from the second processing lane to the lockstep processing system. Specifically, in example embodiments, transmission of the first signal at (806) can occur synchronously with transmission of the second signal at (808). In addition, the first signal can be transmitted from the first and second processing lanes to an interconnect fabric. More specifically, the interconnect fabric can be communicatively coupled to the data synchronizer and the lockstep processing system.

Figure 9:
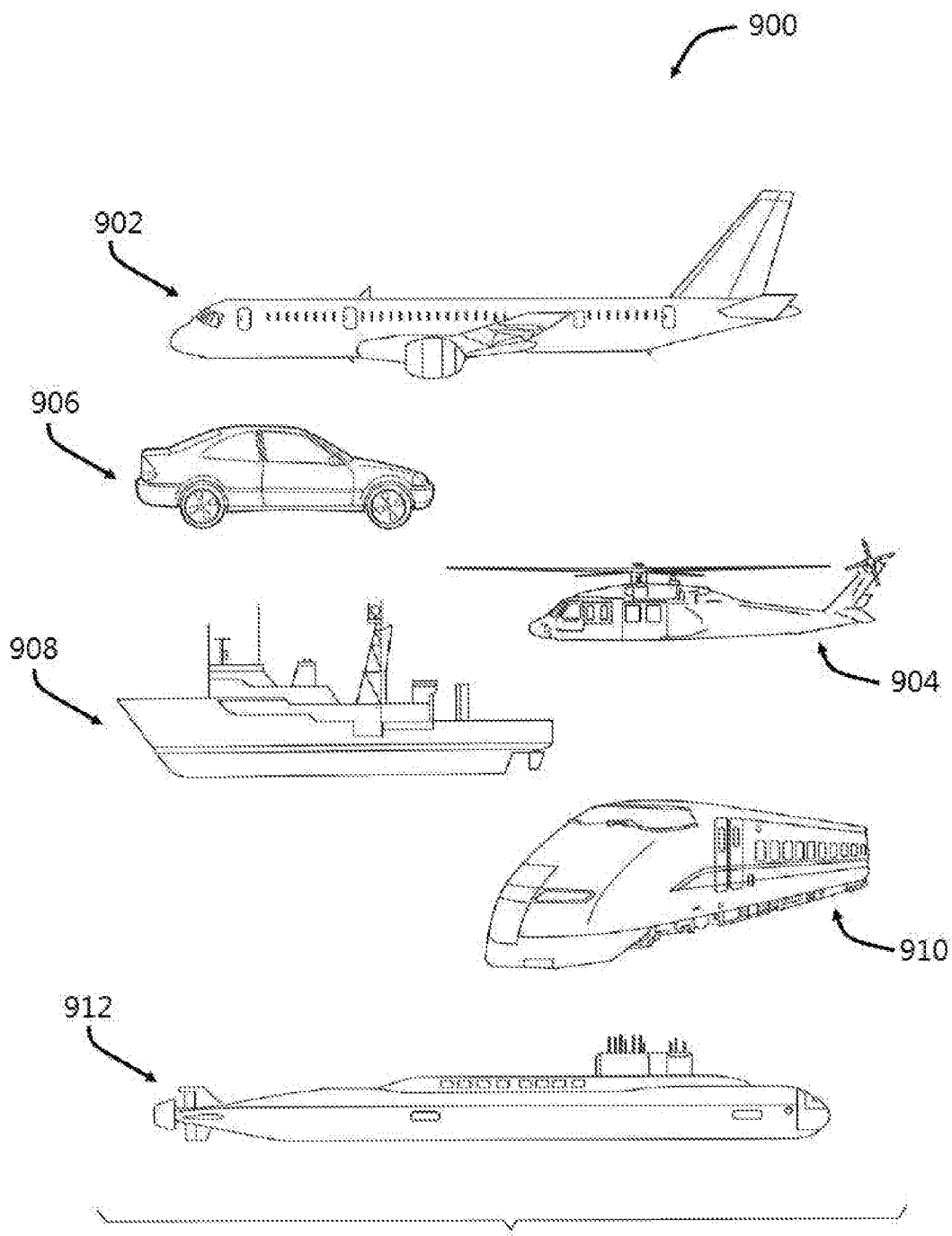
FIG. 9 illustrates example vehicles according to example embodiments of the present disclosure.

Referring now to FIG. 9, example vehicles 900 according to example embodiments of the present disclosure are depicted. The systems and methods of the present disclosure can be implemented on an aerial vehicle 902, helicopter 904, automobile 906, boat 908, train 910, submarine 912 and/or any other suitable vehicles. One of ordinary skill in the art would understand that the systems and methods of the present disclosure can be implemented on other vehicles without deviating from the scope of the present disclosure.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose example embodiments of the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A data synchronizer for managing communications involving a lockstep processing system comprising at least a first processor and a second processor, the data synchronizer configured to:
   receive a first signal at a first processing lane of the data synchronizer;
   transmit the first signal to a second processing lane of the data synchronizer;
   transmit the first signal from the first processing lane to the lockstep processing system; and
   transmit the first signal from the second processing lane to the lockstep processing system,
   wherein transmission of the first signal from the first processing lane to the lockstep processing system occurs synchronously with transmission of the first signal from the second processing lane to the lockstep processing system,
   the data synchronizer further configured to: receive a second signal at the first processing lane, the second signal from the lockstep processing system;
   receive a third signal at the second processing lane, the third signal from the lockstep processing system;
   transmit the second signal to compare logic of the second processing lane; and
   transmit the third signal to compare logic of the first processing lane,
   wherein the lockstep processing system generates both the second signal and the third signal in response to receiving the first signal.

2. The data synchronizer of claim 1, wherein the compare logic of both the first and second processing lanes comprises an exclusive OR gate, and wherein the second signal and the third signal are inputs to the exclusive OR gate.

3. The data synchronizer of claim 2, wherein the exclusive OR gate outputs a first value when the second signal and the third signal are equal to one another, and wherein the exclusive OR gate outputs a second value when the second signal and the third signal are not equal to one another.

4. The data synchronizer of claim 3, further configured to: decode the second signal received at the first processing lane; and decode the third signal received at the second processing lane.

5. The data synchronizer of claim 4, further configured to: transmit a decoded second signal to a first device; and transmit a decoded third signal to a second device.

6. The data synchronizer of claim 5, wherein the exclusive OR gate outputs the first value or the second value before the decoded second signal is transmitted to the first device and the decoded third signal is transmitted to the second device.

7. A method for managing communications involving a lockstep processing system comprising at least a first processor and a second processor, the method comprising:
   receiving, at a first processing lane of a data synchronizer, a first signal from a first device;
   transmitting, by a cross-channel interface of the data synchronizer,
   the first signal to a second processing lane of the data synchronizer;
   transmitting, by the data synchronizer, the first signal from the first processing lane to the lockstep processing system; and
   transmitting, by the data synchronizer, the first signal from the second processing lane to the lockstep processing system,
   wherein transmission of the first signal from the first processing lane to the first processor occurs synchronously with transmission of the first signal from the second processing lane to the second processor,
   receiving, at the first processing lane of the data synchronizer, a second signal from the lockstep processing system;
   receiving, at the second processing lane of the data synchronizer, a third signal from the lockstep processing system;
   transmitting, by the cross-channel interface of the data synchronizer, the second signal to compare logic of the second processing lane; and
   transmitting, by the cross-channel interface of the data synchronizer, the third signal to compare logic of the first processing lane;
   wherein the lockstep processing system generates both the second signal and the third signal in response to receiving the first signal.

8. The method of claim 7, wherein transmitting the first signal to the lockstep processing system further comprises transmitting the first signal, by the data synchronizer, from the first and second processing lanes to an interconnect fabric that is communicatively coupled to the data synchronizer, the first processor and the second processor.

9. The method of claim 7, further comprising: decoding, by the data synchronizer, the second signal received at the first processing lane; and decoding, by the data synchronizer, the third signal received at the second processing lane.

10. The method of claim 9, further configured to: transmitting, by the data synchronizer, a decoded second signal from the first processing lane to the first device; and transmitting, by the data synchronizer, a decoded second signal from the first processing lane to the first device.

* * * * *